(12) United States Patent
Zhang et al.

(10) Patent No.: US 12,103,207 B2
(45) Date of Patent: Oct. 1, 2024

(54) MANUFACTURING METHOD OF COVER MATERIAL FASTENING MEMBER AND MANUFACTURING APPARATUS OF COVER MATERIAL FASTENING MEMBER

(71) Applicant: YKK CORPORATION, Tokyo (JP)

(72) Inventors: Wanli Zhang, Kurobe (JP); Hikaru Okuyama, Kurobe (JP); Atsushi Nakaya, Kurobe (JP); Seiichiro Yonezawa, Kurobe (JP)

(73) Assignee: YKK CORPORATION (JP)

( * ) Notice: Subject to any disclaimer, the term of this patent is extended or adjusted under 35 U.S.C. 154(b) by 3 days.

(21) Appl. No.: 17/323,735

(22) Filed: May 18, 2021

(65) Prior Publication Data
US 2021/0362381 A1 Nov. 25, 2021

(30) Foreign Application Priority Data
May 20, 2020 (JP) .................. 2020-087807

(51) Int. Cl.
*B29C 43/28* (2006.01)
*B29C 43/24* (2006.01)
(Continued)

(52) U.S. Cl.
CPC .............. *B29C 43/28* (2013.01); *B29C 43/24* (2013.01); *B29C 43/46* (2013.01);
(Continued)

(58) Field of Classification Search
CPC ......... B29C 43/28; B29C 43/24; B29C 43/46; B29C 2043/465; B29K 2101/12;
(Continued)

(56) References Cited

U.S. PATENT DOCUMENTS 5,260,015 A 11/1993 Kennedy et al.
6,035,498 A * 3/2000 Buzzell .................. B29C 55/08
24/445

(Continued)

FOREIGN PATENT DOCUMENTS

CN 109071208 A 12/2018
DE 3831636 C1 9/1989
(Continued)

OTHER PUBLICATIONS

YKK CO., LTD.; Office Action for Chinese Patent Application No. 202110561089.9, mailed Jan. 31, 2024, 17 pgs.

*Primary Examiner* — Alison L Hindenlang
*Assistant Examiner* — Shibin Liang
(74) *Attorney, Agent, or Firm* — Taylor English Duma LLP

(57) ABSTRACT

There is provided a manufacturing method of a cover material fastening member including a clip locking member. The clip locking member is integrally provided at an end edge portion of a strip shaped member. The manufacturing method of the cover material fastening member includes: a molding step of filling a resin for forming the clip locking member in a cavity formed on a surface of each of a pair of rolls in rotation; and a press-bonding step of passing the strip shaped member between the pair of rolls in accordance with rotation of the pair of rolls, pressing the resin by the pair of rolls, and continuously press-bonding the clip locking member to two surfaces of the strip shaped member.

5 Claims, 13 Drawing Sheets

(51) Int. Cl.
*B29C 43/46* (2006.01)
*B29K 101/12* (2006.01)
*B29L 31/00* (2006.01)

(52) U.S. Cl.
CPC .... *B29C 2043/465* (2013.01); *B29K 2101/12* (2013.01); *B29L 2031/771* (2013.01)

(58) Field of Classification Search
CPC ....... B29L 2031/771; B32B 3/06; D01F 1/08; A47C 31/02; B60N 2/58
See application file for complete search history.

(56) References Cited

U.S. PATENT DOCUMENTS

| | | | |
|---|---|---|---|
| 6,060,146 | A | 5/2000 | Akeno et al. |
| 6,099,289 | A * | 8/2000 | Jens ........................ B29C 43/46 |
| | | | 425/363 |
| 2014/0352117 | A1 | 12/2014 | Murasaki |
| 2016/0174719 | A1 * | 6/2016 | Saiga ........................ B68G 7/12 |
| | | | 24/531 |
| 2016/0249746 | A1 * | 9/2016 | Saiga ................... A47C 31/023 |
| | | | 24/545 |
| 2018/0266752 | A1 | 9/2018 | Mizuno et al. |
| 2020/0375371 | A1 | 12/2020 | Zhang et al. |

FOREIGN PATENT DOCUMENTS

| | | | |
|---|---|---|---|
| EP | 1583110 | * 10/2005 | ............... H01B 7/40 |
| JP | H10146206 | 6/1998 | |
| JP | 2018057638 A | 4/2018 | |
| WO | 2013069114 | 5/2013 | |
| WO | 2016170687 | 10/2016 | |
| WO | 2019021367 | 1/2019 | |

* cited by examiner

MANUFACTURING METHOD OF COVER MATERIAL FASTENING MEMBER AND MANUFACTURING APPARATUS OF COVER MATERIAL FASTENING MEMBER

CROSS-REFERENCE TO RELATED APPLICATIONS

This application is based on Japanese Patent Application No. 2020-087807 filed on May 20, 2020, the contents of which are incorporated herein by way of reference.

BACKGROUND

The present invention relates to a manufacturing method and a manufacturing apparatus of a cover material fastening member for stretching a cover material that covers a surface of a chair, a seat, or the like onto a seat or the like and fixing an end edge of the cover material at a predetermined position.

In the related art, a chair used indoors, a seat of a vehicle, or the like is provided with a cushion material or a soft pad at a portion to be in contact with a human body, such as a seating surface and a backrest, and a surface of the cushion material or the soft pad portion is often covered with a cover material. Various structures are adopted for covering with the cover material and fixing the cover material. In particular, there is a cover material fastening member having a structure capable of hiding an end edge of the cover material from an external appearance while fixing the cover material in a simple and neat manner. In an attachment structure of the cover material fastening member, a wire is disposed in a groove of a cushion material of a seat or the like, and the cover material fastening member is sewn along the end edge of the cover material. Clips are engaged with the cover material fastening member at a predetermined interval, and these clips are engaged with the wire in the cushion member provided on a seat or the like. The cover material is fastened to a seat or the like in a state in which tension is applied to the cover material.

For example, Patent Literature 1 discloses a cover material fastening member. The cover material fastening member includes a tape member that is a strip shaped member for sewing a sheet member, and a clip locking member formed by integrally molding a resin at an end edge portion at an opposite side to the sheet material at an end edge portion parallel to a long side direction of the tape member. The cover material fastening member is formed into a long shape and is formed to have the same length as the tape member. A cross-sectional shape in a direction orthogonal to a long side direction of the clip locking member is formed into an arrow shape. Groove shaped joint portions that are cut in a direction orthogonal to the long side direction are provided at a predetermined short interval along the long side direction. Accordingly, a pair of leg portions of a clip can engage with the cover material fastening member and the clip can be attached without moving in the long side direction. Further, the clip can be attached to any position in the long side direction by changing a locking position at a joint portion of the cover material fastening member. A hook of the clip is engaged with the wire in the cushion material, and the cover material is fastened onto a surface of the cushion material.

The clip locking member of the cover material fastening member is fixed by being integrally molded onto a surface of the tape member, and the clip locking member is formed to be continuous with the long tape member. A manufacturing method of the clip locking member can be considered to be the same as, for example, a manufacturing method of a hook and loop fastener disclosed in Patent Literature 2. That is, a pair of molding rolls is used for molding the clip locking member, a resin for forming the clip locking member is injected into a cavity formed on a surface of each of the molding rolls, and the clip locking member is formed on a surface of the tape member.

Patent Literature 1: WO-A1-2013/069114
Patent Literature 2: JP-A-H10-146206

In the manufacturing method disclosed in Patent Literature 2, a resin is integrally molded with a porous sheet material, and a molten resin can easily enter and can be integrated with the sheet material. Since the porous sheet material is contained in the resin without being exposed, a bonding strength between the resin and the porous sheet material does not have to be high. However, since the cover material fastening member is required to have a certain degree of strength for fastening the cover material, a tape member having a dense structure and strength is used. Since it is preferable that one end of the tape member is exposed to facilitate sewing of the cover material, the resin is needed to be firmly coupled and fixed to one end of the tape member. Therefore, the manufacturing method disclosed in Patent Literature 2 cannot be used for molding the clip locking member of the cover material fastening member.

In addition, since the tape member has a dense structure, it is difficult to firmly and integrally mold the resin on the surface of the tape member. In particular, when the resin is continuously and integrally molded on the surface of the long tape member using the molding rolls, it is difficult to increase an injection pressure of the resin to the tape member or a press-contact pressure between the resin and the tape member, and it is difficult to efficiently and continuously manufacture the tape member and the clip locking member while increasing the bonding strength between the tape member and the clip locking member.

The present invention has been made in view of the above problems and an object of the present invention is to provide a manufacturing method and a manufacturing apparatus of cover material fastening member capable of easily and continuously molding the clip locking member and increasing the bonding strength between a strip shaped member and the clip locking member.

SUMMARY

According to the present invention, there is provided a manufacturing method of a cover material fastening member including a clip locking member that is attached to an end edge of a cover material and to which a fastening clip is locked. The fastening clip is used for attaching and fixing the cover material so as to cover a surface of a seat. The clip locking member is integrally provided along a long side direction at an end edge portion of a strip shaped member fixed to the end edge of the cover material. The manufacturing method of the cover material fastening member includes: a molding step of filling a resin for forming the clip locking member in a cavity formed on a surface of each of a pair of rolls in rotation; and a press-bonding step of passing the strip shaped member between the pair of rolls in accordance with rotation of the pair of rolls, pressing the resin by the pair of rolls, and continuously press-bonding the clip locking member to two surfaces of the strip shaped member.

A central plate shaped portion formed at the end edge portion of the strip shaped member along the long side direction, a plurality of rib portions of which each has a surface intersecting the central plate shaped portion and that are formed at a predetermined interval along the long side direction, and a plurality of locking recessed portions formed between the rib portions, are provided in the clip locking member. In the press-bonding step, the central plate shaped portion is formed at two sides of the strip shaped member, and the rib portions and the locking recessed portions are formed on at least one surface of the strip shaped member, by rotating the pair of rolls.

In the press-bonding step, the central plate shaped portion, the rib portions, and the locking recessed portions are formed at symmetrical positions and/or into symmetrical shapes at the two sides of the strip shaped member, by rotating the pair of rolls.

In the press-bonding step, the resin is partially or entirely melted at a press-bonding surface side before the resin is press-bonded to the strip shaped member, and is solidified after the resin is press-bonded to the strip shaped member.

According to the present invention, there is provided a manufacturing apparatus of a cover material fastening member including a clip locking member that is attached to an end edge of a cover material and to which a fastening clip is locked. The fastening clip is used for attaching and fixing the cover material so as to cover a surface of a seat. The clip locking member is integrally provided along a long side direction at an end edge portion of a strip shaped member fixed to the end edge of the cover material. The manufacturing apparatus of the cover material fastening member includes: a pair of rolls in which a cavity is formed on a surface of each of the pair of rolls; and a nozzle member that is configured to fill a resin for forming the clip locking member in the cavity of each of the pair of rolls and that is provided to face the cavity of each of the pair of rolls. The pair of rolls in rotation passes the strip shaped member therebetween, and the resin injected from the nozzle member to the cavity can be continuously and integrally molded on two surfaces of the strip shaped member.

The cavity is provided with continuous formation portions for molding a central plate shaped portion of the clip locking member, a plurality of rib portions of which each has a surface intersecting the central plate shaped portion and that are provided at a predetermined interval along the long side direction, and a plurality of locking recessed portions provided between the rib portions. The formation portions of the cavity are provided to form the rib portions and the locking recessed portions at symmetrical positions and/or into symmetrical shapes on the two surfaces of the strip shaped member.

DESCRIPTION OF EMBODIMENTS

Figure 1:
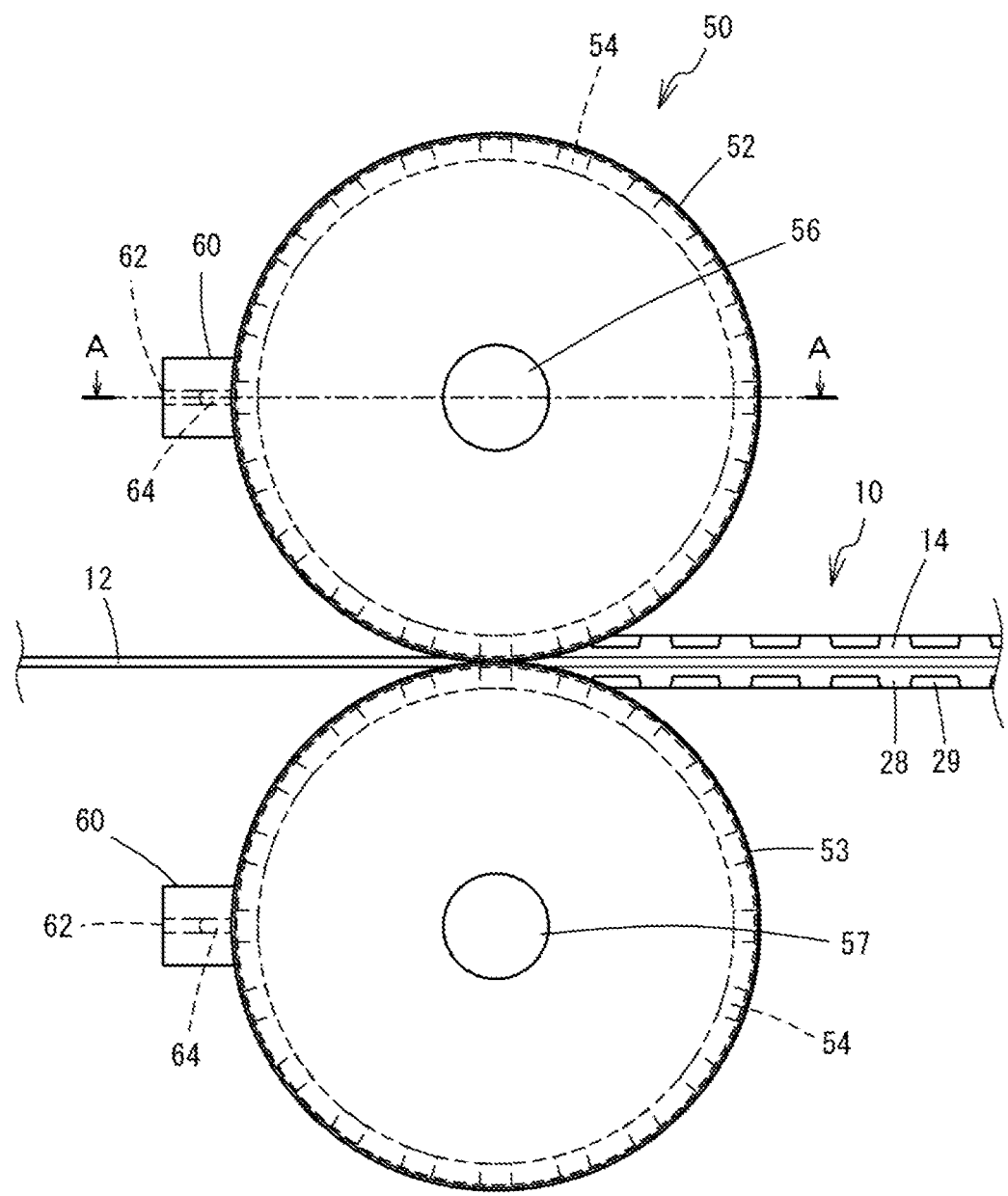
FIG. 1 is a front view showing molding rolls of a manufacturing apparatus of a cover material fastening member according to an embodiment of the present invention.
Figure 2:
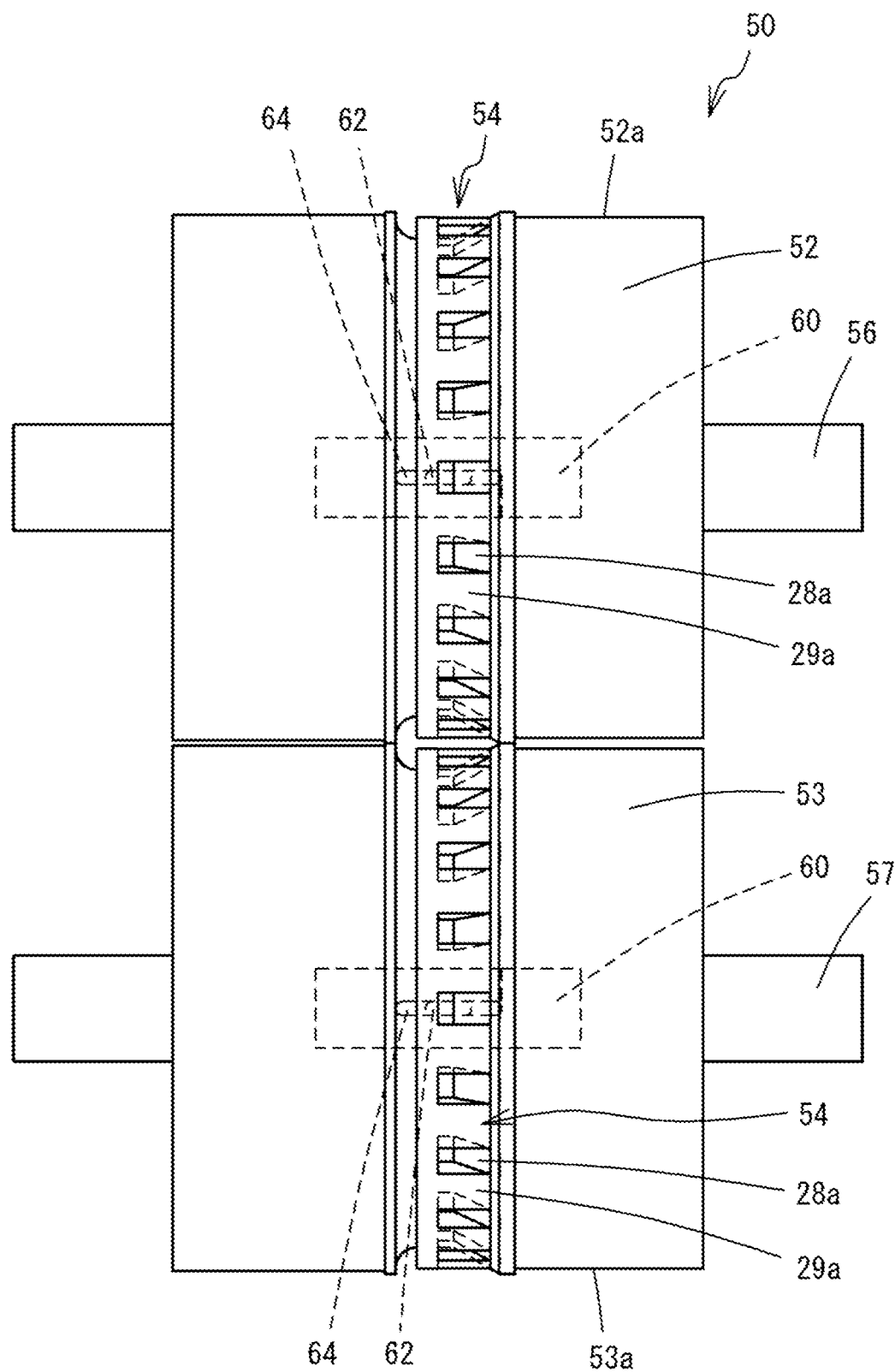
FIG. 2 is a right side view showing the molding rolls of the manufacturing apparatus of the cover material fastening member according to the embodiment of the present invention.
Figure 3:
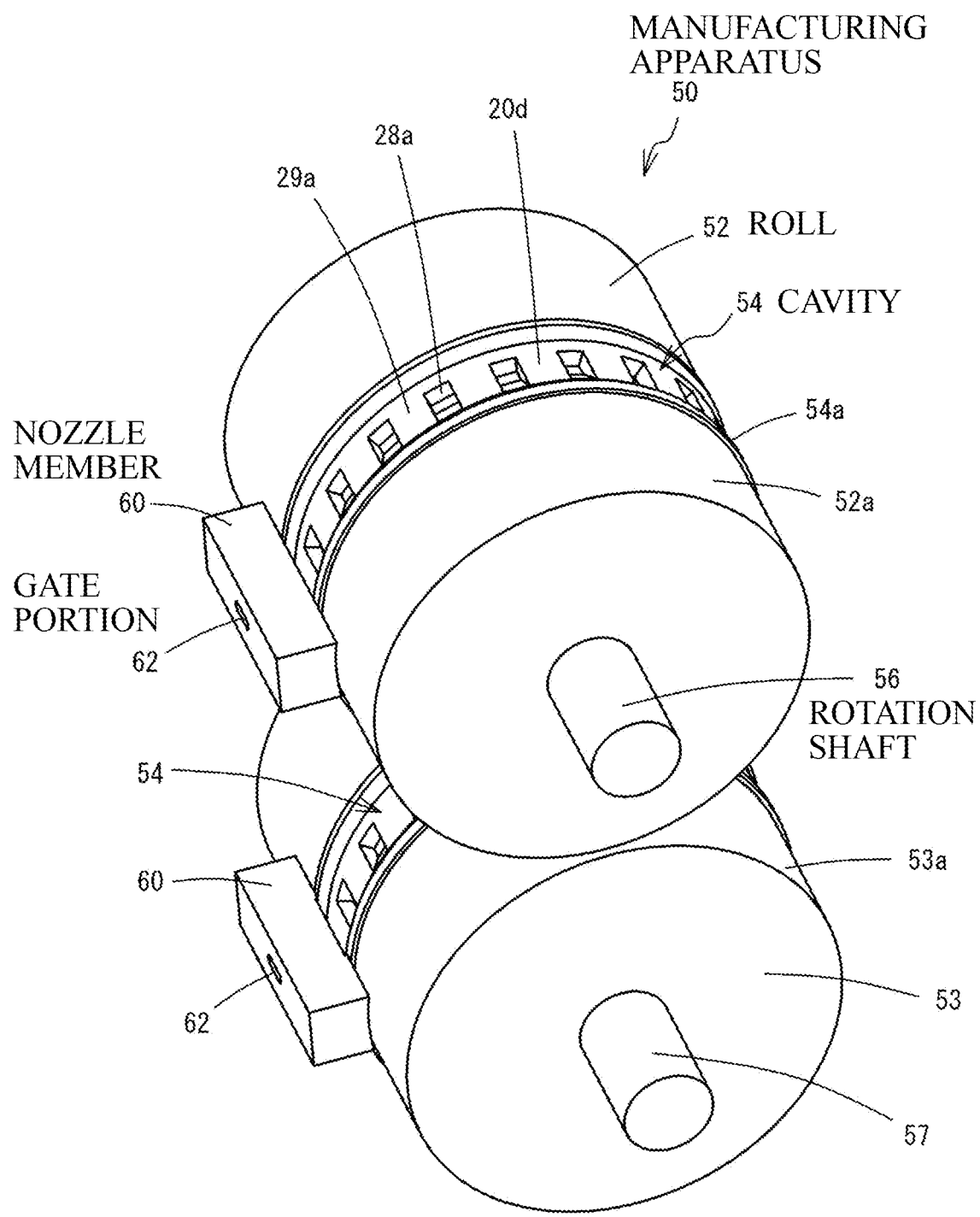
FIG. 3 is a perspective view showing the molding rolls of the manufacturing apparatus of the cover material fastening member according to the embodiment of the present invention.
Figure 4:
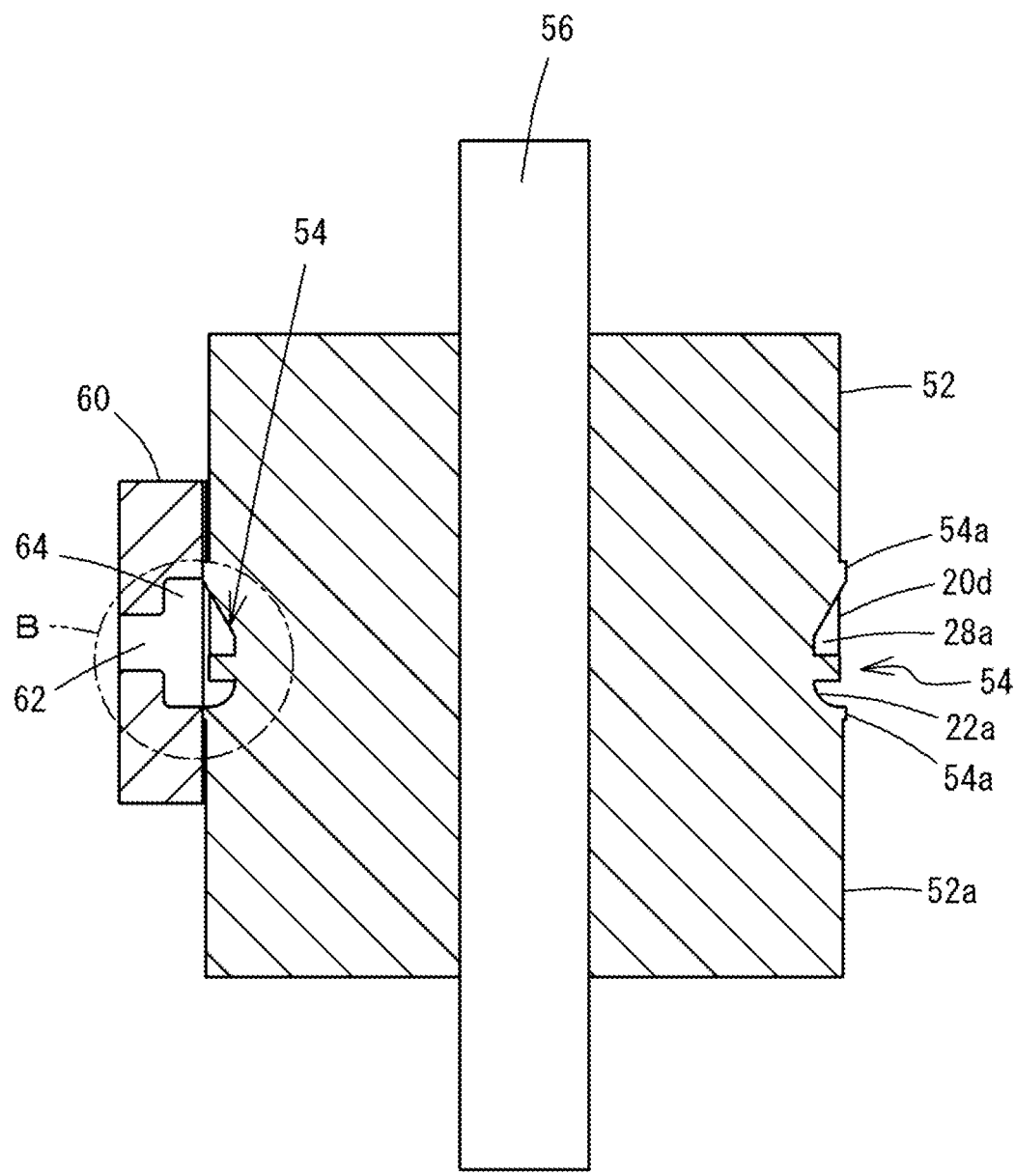
FIG. 4 is a cross-sectional view taken along a line A-A in FIG. 1.
Figure 5:
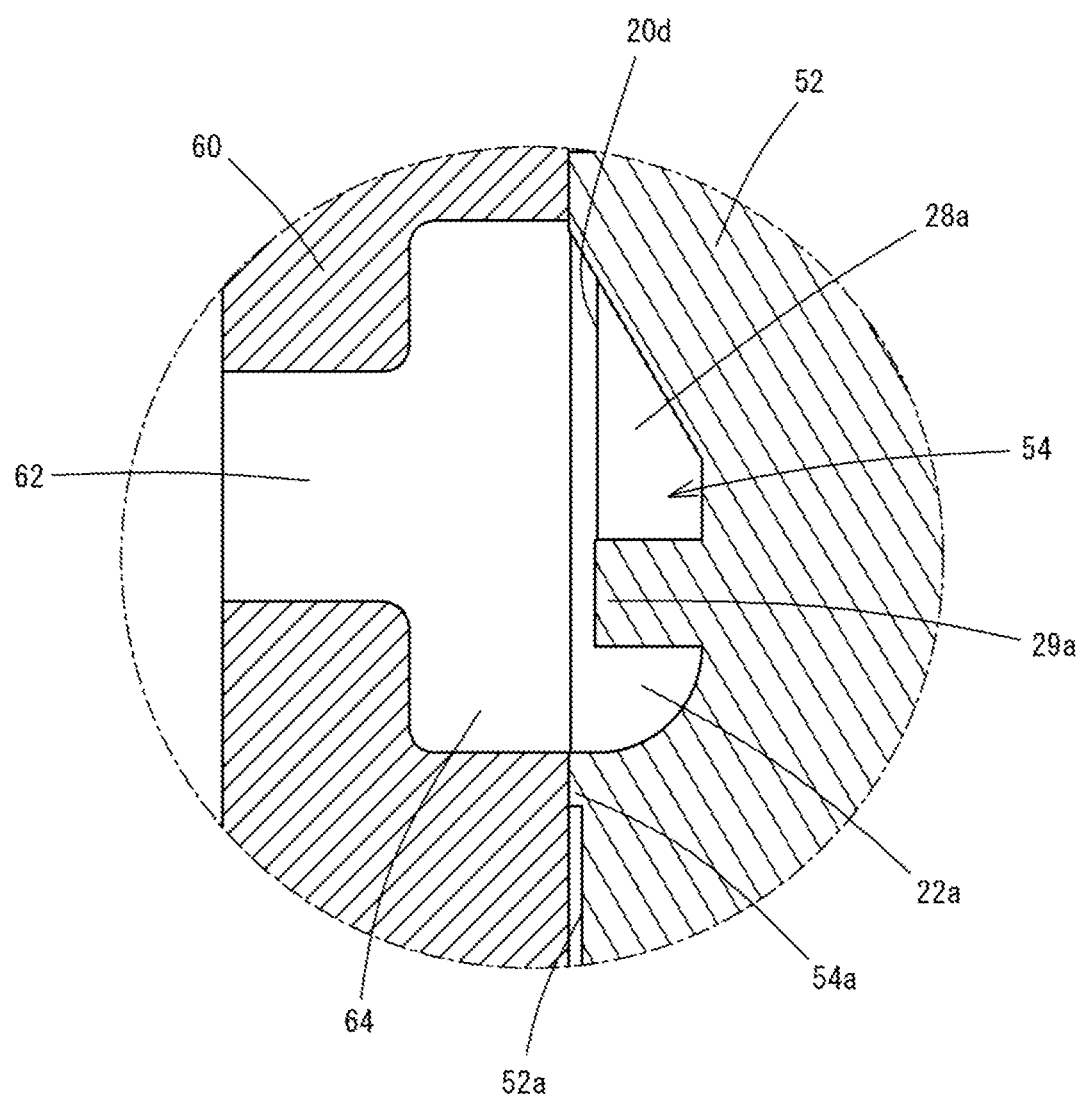
FIG. 5 is an enlarged cross-sectional view showing a portion B in FIG. 4.
Figure 6A:
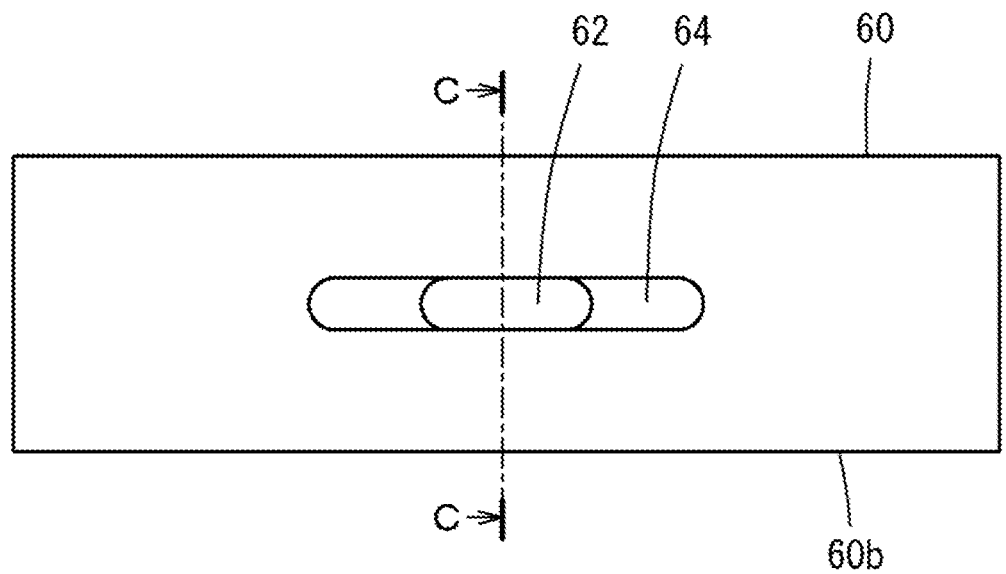
FIG. 6A is a front view showing a nozzle member of the manufacturing apparatus of the cover material fastening member according to the embodiment of the present invention.
Figure 6B:
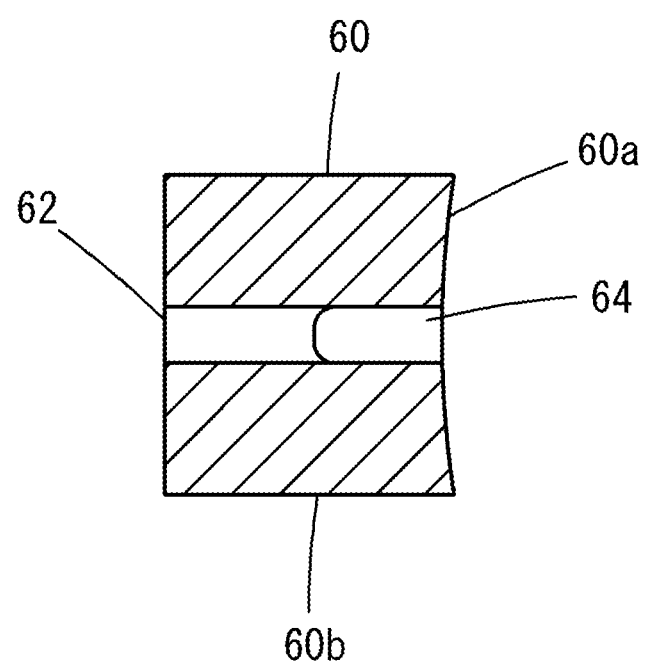
FIG. 6B is a cross-sectional view taken along a line C-C in FIG. 6A.

Hereinafter, a manufacturing method of a cover material fastening member and a manufacturing apparatus of a cover material fastening member according to an embodiment of the present invention will be described with reference to the drawings. First, as shown in FIGS. 7 to 12B, a cover material fastening member 10 manufactured by the manufacturing method and the manufacturing apparatus according to the present embodiment includes a long strip shaped member 12 such as woven fabric, and a clip locking member 14 provided along a long side direction of the strip shaped member 12. The clip locking member 14 is formed of a thermoplastic resin such as polypropylene, polyethylene, polyvinyl chloride, polystyrene, and polybutylene terephthalate. The clip locking member 14 is integrally insert-molded along the long side direction at an end edge portion 12a of the strip shaped member 12 at a side opposite to an end edge portion 12b where a cover material 18 is fixed. The clip locking member 14 is used to attach a fastening clip 30 or the like to be described later.

Figure 11:
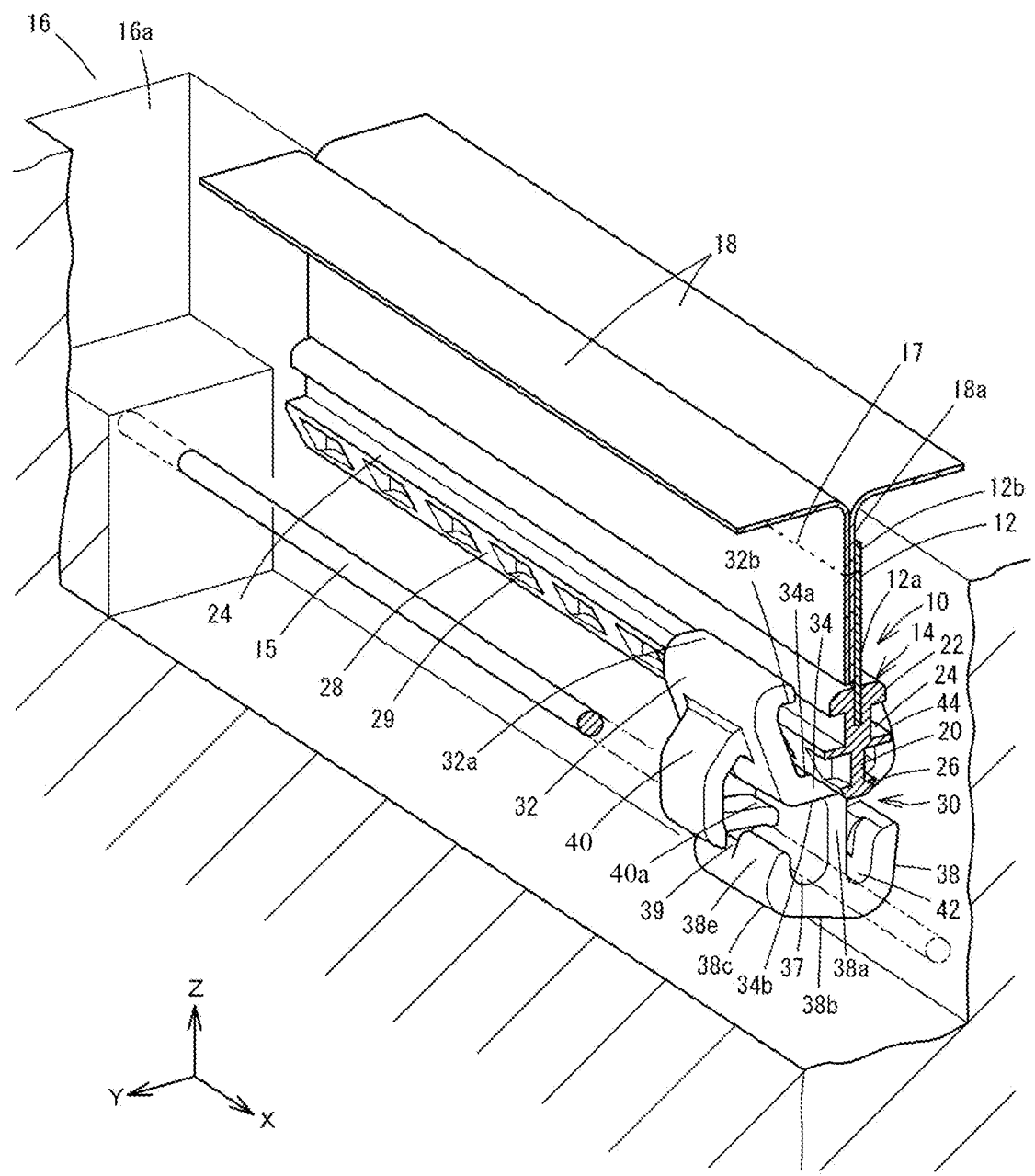
FIG. 11 is a partially cutaway perspective view showing a usage state of the cover material fastening member manufactured by the manufacturing apparatus of the cover material fastening member according to the embodiment of the present invention.

As shown in FIG. 11, the cover material fastening member 10 is used to stretch a cover material 18 of a seat at a predetermined position on a surface of a cushion material 16 of a seat of a vehicle or the like. The cover material 18 is leather, cloth, synthetic leather sheet, or the like that covers the surface of the cushion material 16. The strip shaped member 12 of the cover material fastening member 10 is sewn and fixed to an end edge 18a inserted into a groove 16a of the cushion material 16 by a sewing thread 17.

The cushion material 16 is a synthetic resin foam material such as polyurethane foam molded into a seat shape. The groove 16a for fastening a cover material is formed in the cushion material 16. A wire 15 is disposed in the groove 16a.

The wire 15 is a metal wire member. Since the wire 15 is incorporated by insert-molding during molding the cushion material 16, the wire 15 is firmly fixed so that the wire 15 is not displaced.

Figure 7:
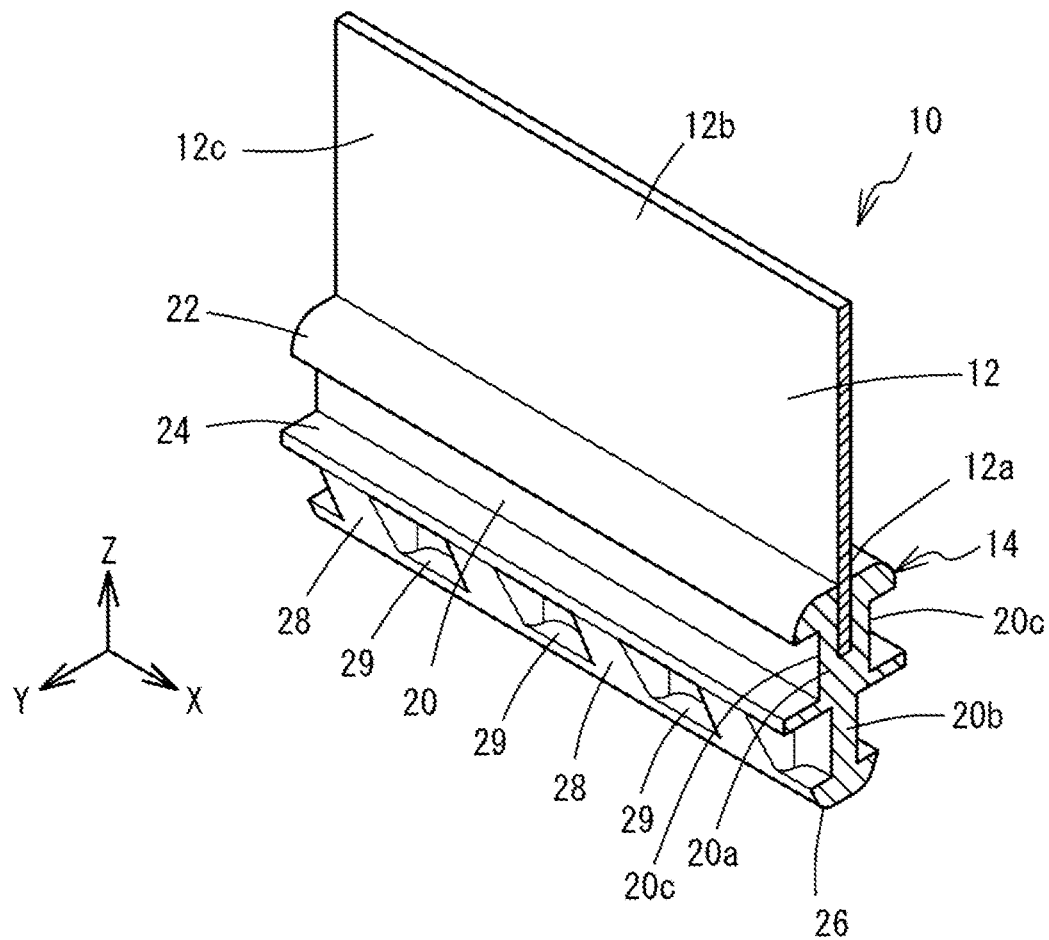
FIG. 7 is a partially cutaway perspective view showing a cover material fastening member manufactured by the manufacturing apparatus of the cover material fastening member according to the embodiment.

As shown in FIGS. 7 and 11, and the like, the cover material fastening member 10 according to the present invention will be described with reference to X, Y, and Z axial directions that are orthogonal to one another. The X axial direction coincides with the long side direction of the cover material fastening member 10, and coincides with an extension direction of an end edge of the cover material 18. An insertion direction in which the cover material fastening member 10 is inserted into the groove 16a of the cushion material 16 is the Z axial direction orthogonal to the X axial direction, and is referred to as an upper-lower direction. The Y axial direction is a direction orthogonal to the X axial direction that is the long side direction of the cover material fastening member 10 and the Z axial direction that is the upper-lower direction, and is referred to as a left-right direction. A direction parallel to the left-right direction is also referred to as a lateral direction.

As shown in FIGS. 7 to 12B, the strip shaped member 12 of the cover material fastening member 10 according to the present embodiment is a long member having a strip shape that is long in the X axial direction with a constant width in the Z axial direction. The strip shaped member 12 is formed of woven fabric, non-woven fabric, knitted fabric, synthetic leather, a laminated body of synthetic leather and cloth, and the like having the same strength as the cover material 18. A material for forming the strip shaped member 12 may be selected from appropriate materials such as nylon, polyester, and acrylic. The strip shaped member 12 may be a member separated from the clip locking member 14, or may be formed of a resin integrally with the clip locking member 14.

The clip locking member 14 integrally provided along the end edge portion 12a of the strip shaped member 12 is provided along the long side direction of the strip shaped member 12 by insert molding a thermoplastic resin in a manner of sandwiching the end edge portion 12a of the strip shaped member 12. The clip locking member 14 is formed to have the same length as the strip shaped member 12.

The clip locking member 14 has a surface parallel to a surface of the strip shaped member 12, and includes a central plate shaped portion 20 having a long shape with a constant width in the X axial direction. A width of the central plate shaped portion 20 in the Y axial direction that is a direction orthogonal to a surface 12c of the strip shaped member 12 is larger than that of the strip shaped member 12. The central plate shaped portion 20 is provided in a manner of integrally sandwiching the strip shaped member 12. A holding portion 20a that is a side where the strip shaped member 12 is held is provided at one end edge along a long side direction of the central plate shaped portion 20. An end edge flange portion 22 at a base end side has a surface that extends in a direction orthogonal to the surface of the central plate shaped portion 20 and extends in the X axial direction. The end edge flange portion 22 is integrally formed at the holding portion 20a. Edge corner portions at two sides of the end edge flange portion 22 along the X axial direction at a side of the strip shaped member 12 are chamfered to have a curved surface curved to the outside. An intermediate flange portion 24 is integrally formed at an intermediate portion of the central plate shaped portion 20 in the Z axial direction. The intermediate flange portion 24 has a surface that extends in a direction orthogonal to the surface of the central plate shaped portion 20 and extends in the X axial direction. The intermediate flange portion 24 has a larger width in the Y axial direction than the end edge flange portion 22. The intermediate flange portion 24 is formed in a manner of including a central portion of the central plate shaped portion 20 in the Z axial direction.

An end edge flange portion 26 at a lower end side is integrally formed at an end edge of a lower end portion 20b along the X axial direction that is the long side direction. The lower end portion 20b is located at a lower end side of the central plate shaped portion 20 at an opposite side to the holding portion 20a, and the intermediate flange portion 24 is interposed between the lower end portion 20b and the holding portion 20a. A lower end side of each of edge corner portions at two sides of the end edge flange portion 26 in the X axial direction is chamfered to have a curved surface curved to the outside. The end edge flange portions 22 and 26 are formed at two end edges of the central plate shaped portion 20 in parallel to the X axial direction. A width of the end edge flange portion 26 at the lower end side in the Y axial direction is slightly smaller than that of the end edge flange portion 22 at the base end side. A width between two side edge portions of each of the end edge flange portions 22 and 26 in the Y axial direction is smaller than a width between two side edge portions of the intermediate flange portion 24 in the Y axial direction. A thickness of each of the end edge flange portions 22 and 26 in the Z axial direction is larger than a thickness of the intermediate flange portion 24. A dimension of each of the flange portions 22, 24, and 26 in the Y axial direction orthogonal to the surface 20c of the central plate shaped portion 20 is larger than a dimension of each of the flange portions 22, 24, and 26 in the upper-lower direction that is the Z axial direction orthogonal to the long side direction of the central plate shaped portion 20.

Figure 8:
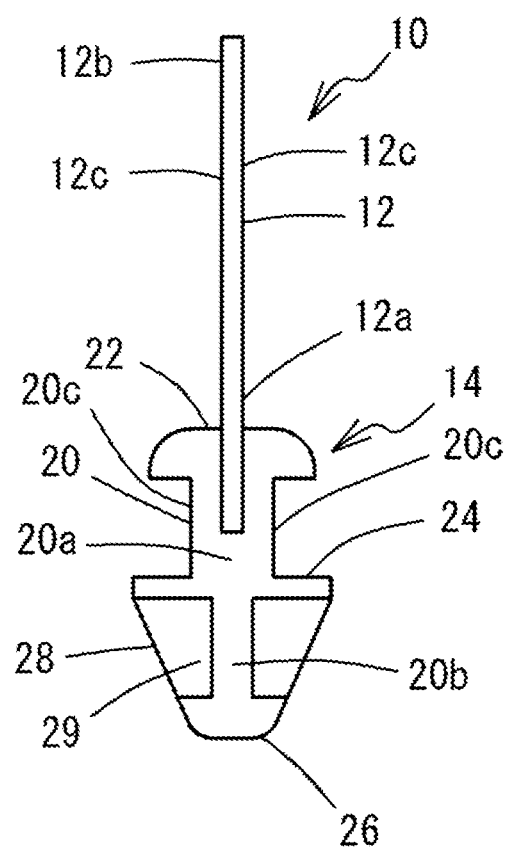
FIG. 8 is a right side view showing the cover material fastening member manufactured by the manufacturing apparatus of the cover material fastening member according to the embodiment.
Figure 9A:
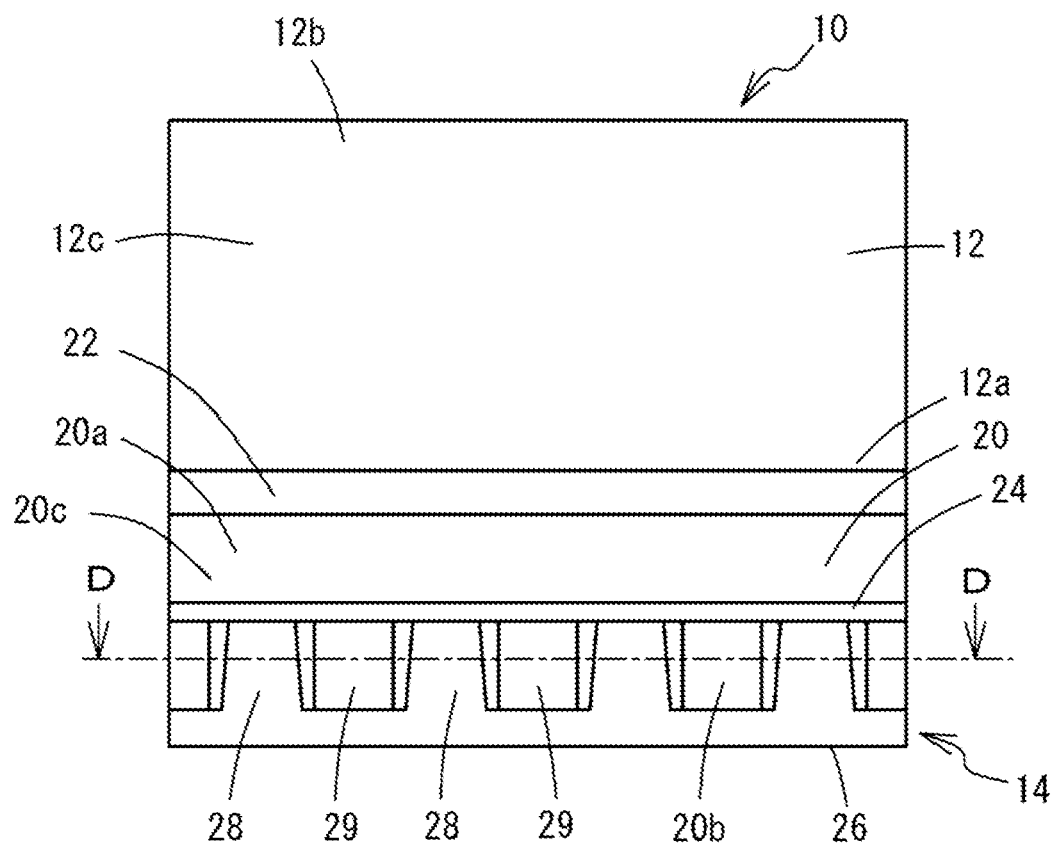
FIG. 9A is a front view showing the cover material fastening member manufactured by the manufacturing apparatus of the cover material fastening member according to the embodiment.
Figure 9B:
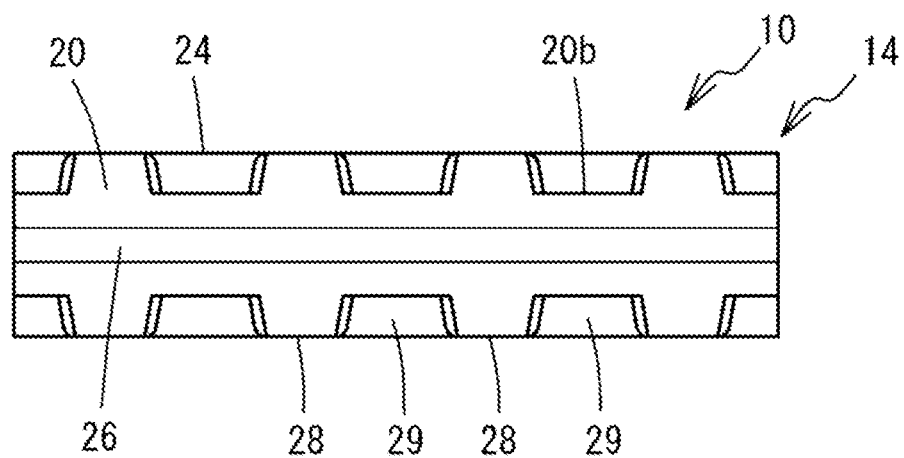
FIG. 9B is a bottom view of FIG. 9A.
Figure 10:
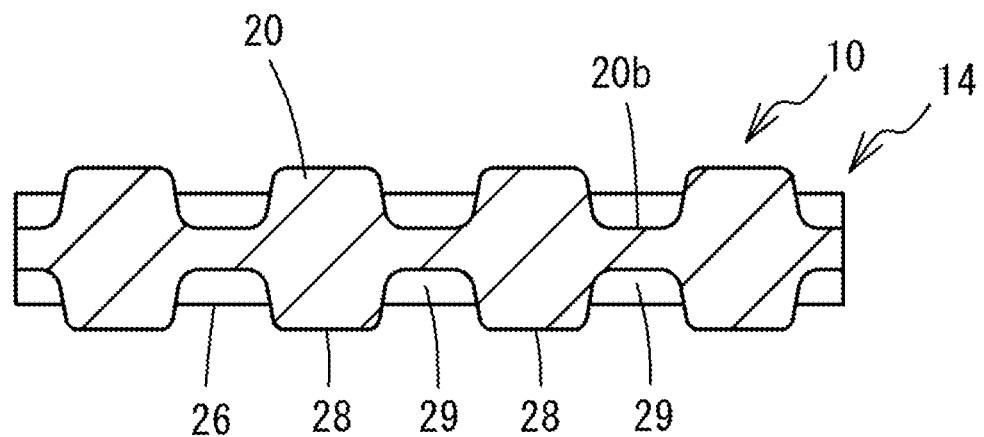
FIG. 10 is a cross-sectional view taken along a line D-D in FIG. 9A.

As shown in FIG. 8, in a cross-sectional shape of a surface of the cover material fastening member 10 extending in a direction orthogonal to the X axial direction that is the long side direction of the central plate shaped portion 20, the end edge flange portions 22 and 26 and the intermediate flange portion 24 are linearly symmetric about a central axis of the central plate shaped portion 20 in the Z axial direction that is the upper-lower direction. A plurality of rib portions 28 and a plurality of recessed portions 29 are alternately formed on two surfaces of the central plate shaped portion 20 at a certain interval along the long side direction of the central plate shaped portion 20. The plurality of rib portions 28 protrude in the Y axial direction orthogonal to a surface of each of the central plate shaped portion 20, the intermediate flange portion 24, and the end edge flange portion 26 at the lower end side. The rib portions 28 and the recessed portions 29 are formed on two surfaces of the central plate shaped portion 20, and are integrally provided and protrude in a manner of connecting with a lower surface of the intermediate flange portion 24 in the Z axial direction and an upper surface of the end edge flange portion 26 at the lower end side in the Z axial direction. The rib portions 28 and the recessed portions 29 are formed at a certain interval along the X axial direction of the clip locking member 14 at facing positions of the two surfaces of the central plate shaped portion 20 and are formed to be linearly symmetric about the central plate shaped portion 20. A width in the Y axial direction between two surfaces of each of the rib portions 28 gradually decreases linearly from the intermediate flange portion 24 toward the end edge flange portion 26. Each of the rib portions 28 is formed into an inclined shape in the Z axial direction at two sides of the central plate shaped portion 20.

Figure 12A:
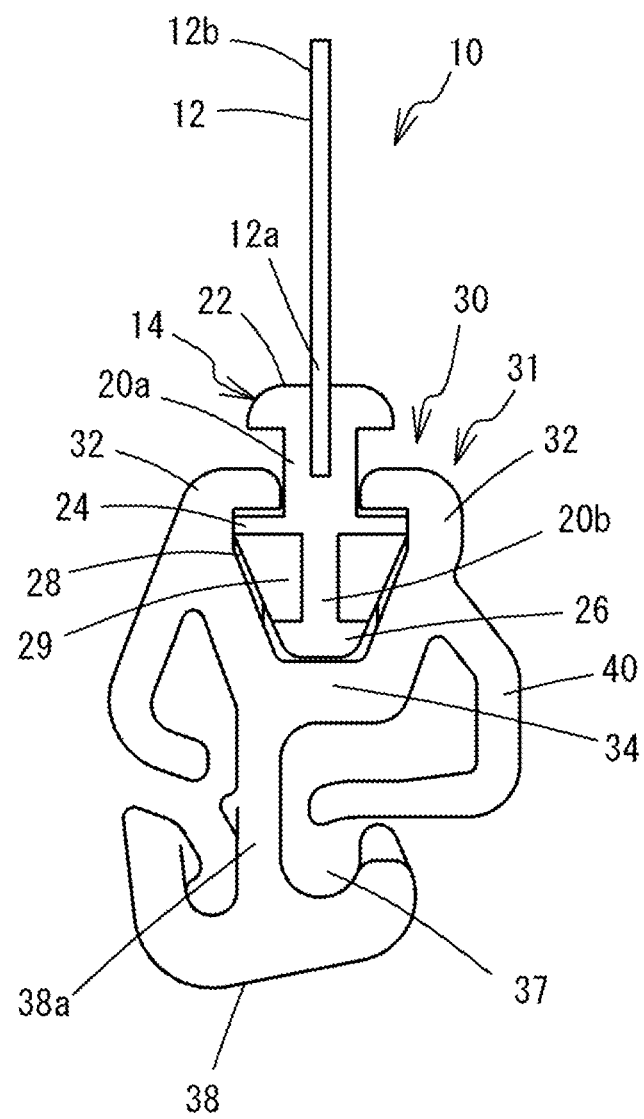
FIG. 12A is a right side view showing a state in which a fastening clip is locked to a clip locking member of the cover material fastening member according to the embodiment of the present invention.
Figure 12B:
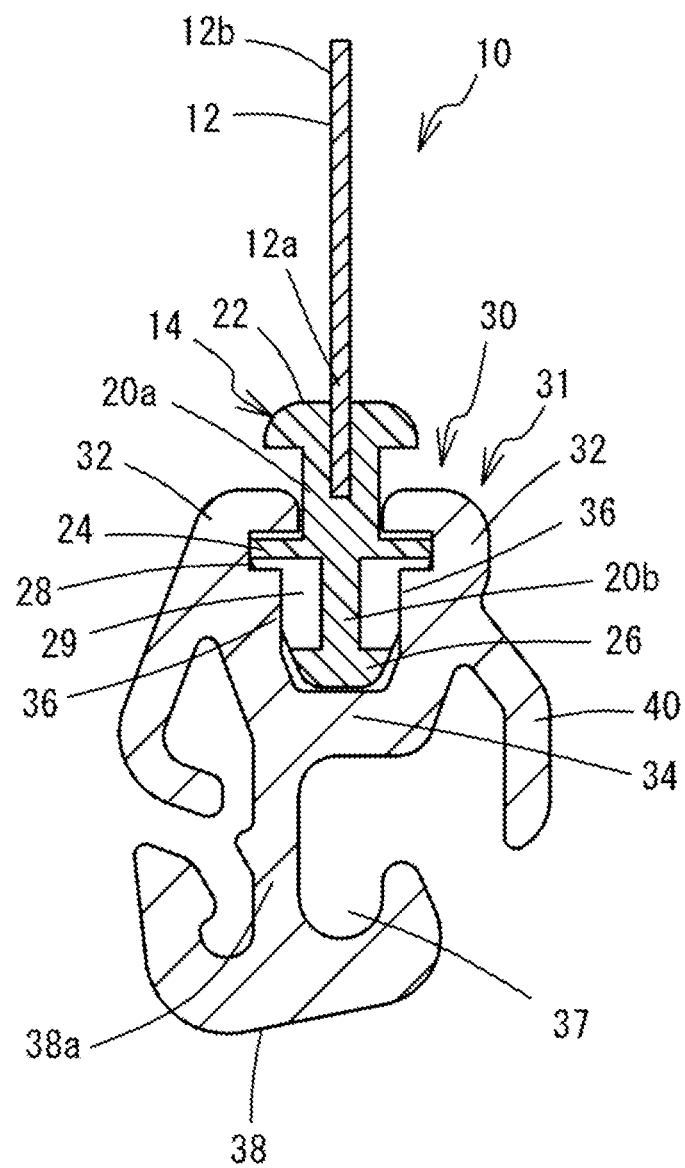
FIG. 12B is a cross-sectional view taken along Y-Z direction in FIG. 12A.

The fastening clip 30 locked to the cover material fastening member 10 according to the present embodiment is integrally molded of a synthetic resin. The fastening clip 30 has a pair of locking claws 32 as shown in FIGS. 11, 12A and 12B. The locking claws 32 are formed in a manner of facing each other. Base end portions of the locking claws 32 are integrally provided at two sides of a locking claw base portion 34 of the fastening clip 30. In FIGS. 12A and 12B, the locking claws 32 protrude upward in the Z axial direction from the locking claw base portion 34, and an interval in the left-right direction between the locking claws 32 increases as extending upward. Tip end portions of the locking claws 32 are bent in a direction in which the tip end portions are brought close to face each other in the Y axial direction, that is, toward respective inner sides of the tip end portions. The locking claws 32 and the locking claw base portion 34 forms a locking portion 31. The clip locking member 14 of the cover material fastening member 10 is locked from the intermediate flange portion 24 to the end edge flange portion 26 at the lower end side by the locking claws 32 by being interposed between the locking claws 32.

Locking protrusions 36 are respectively provided on facing inner side surfaces of the pair of locking claws 32. The locking protrusions 36 are provided at an intermediate position in the X axial direction intersecting a direction in which the locking claws 32 face each other, and the locking protrusions 36 protrude in a manner of facing each other in the Y axial direction. A thickness of each of the locking protrusions 36 in the X axial direction is substantially constant, is smaller than a width of each of the locking recessed portions 29 of the clip locking member 14 in the X axial direction. The locking protrusions 36 can be fitted to the locking recessed portions 29 of the clip locking member 14 and are locked by the rib portions 28. Therefore, the fastening clip 30 can be locked by the rib portions 28 by adjusting a position of the fastening clip 30 in the X axial direction of the clip locking member 14.

A hook 38 is provided on a lower surface of the locking claw base portion 34. The hook 38 is provided continuously from one end portion of the pair of locking claws 32. The hook 38 includes an extending portion extending downward in the Z axial direction, and a claw shaped portion that is bent from a tip end of the extending portion in a right direction in FIGS. 12A and 12B, and that is inclined toward the locking portion 31. A U-shaped groove portion surrounded by the extending portion and the claw shaped portion serves as a wire holding space 37 through which the wire 15 is inserted.

Of the pair of locking claws 32, the locking claw 32 facing a tip end portion 38e of the hook 38 is provided with a wire guide piece 40 that is integrally formed with the locking claw 32. The wire guide piece 40 is provided in the vicinity of an intermediate portion of the locking claw 32 in a protruding direction of the locking claw 32. The wire guide piece 40 extends in an inclined direction and extends downward as the wire guide piece 40 is away from the locking claw 32. The wire guide piece 40 is bent in the vicinity of a side of a lower surface 34b of the locking claw base portion 34, and extends downward in the Z axial direction in parallel to an extending portion 38a of the hook 38. The wire guide piece 40 is bent at an angle of about 90 degrees at a position in the vicinity of an intermediate portion of the extending portion 38a of the hook 38. A wire insertion hole into which the wire 15 is inserted is formed between the wire guide piece 40 and the hook 38. A diameter of the wire insertion hole is slightly smaller than a diameter of the wire 15, so that the wire 15 can be prevented from coming off after the wire 15 passes through the wire insertion hole, and the wire 15 can be reliably held in the wire holding space 37. Then, the fastening clip 30 is locked by the rib portions 28 by adjusting a position of the fastening clip 30 in the X axial direction of the clip locking member 14, and is engaged with the wire 15 of the cushion material 16, so that no wrinkle occurs on the cover material 18. Accordingly, the cover material 18 can neatly cover the cushion material 16.

Next, a manufacturing apparatus and a manufacturing method for insert molding the clip locking member 14 to the long strip shaped member 12 of the cover material fastening member 10 according to the present embodiment will be described. As shown in FIGS. 1 to 5, the manufacturing apparatus 50 of the cover material fastening member includes a pair of rolls 52 and 53 used to form the clip locking member 14 formed of a resin at the end edge portion 12a of the strip shaped member 12. A cavity 54 for forming the clip locking member 14 is formed on a surface of each of the pair of rolls 52 and 53. Side surfaces of the pair of rolls 52 and 53 face each other and the pair of rolls 52 and 53 can rotate around rotation shafts 56 and 57.

The cavity 54 is formed around a side surface of each of the pair of rolls 52 and 53 on a circumference at a predetermined pitch, and the resin for forming the clip locking member 14 can be filled in the cavity 54. A shape of the cavity 54 is formed into a space shape corresponding to a half side surface shape of the clip locking member 14 in the Y axial direction centered on the strip shaped member 12. The cavity 54 is formed into a shape in which a formation portion 20d for the central plate shaped portion 20 of the clip locking member 14, a formation portion 22a for the end edge flange portion 22, a formation portion 28a for the rib portions 28, a formation portion 29a for the locking recessed portions 29, a formation portion (not shown) for the end edge flange portion 26 or the intermediate flange portion 24, and the like are molded continuously at a predetermined pitch.

The cavity 54 of each of the pair of rolls 52 and 53 is formed into a symmetrical shape around the center of each of the pair of rolls 52 and 53 at positions facing each other. Then, phases of the cavities 54 of the pair of rolls 52, 53 coincide with each other so that the clip locking member 14 to be molded is formed symmetrically around a center line in a thickness direction of the strip shaped member 12. Side portions of circumferential surfaces of the pair of rolls 52 and 53 on which the cavities 54 are formed are holding side surface 52a and 53a that holds the strip shaped member 12. The holding side surfaces 52a and 53a are formed to have a small step with respect to the outer side end edge 54a of the cavity 54. The step is equal to or less than ½ of the thickness of the strip shaped member 12.

Nozzle members 60 facing the pair of rolls 52 and 53 are located at a position of $\pi/2$ in a direction opposite to a rotation direction of the pair of rolls 52 and 53 from a position where the pair of rolls 52 and 53 face each other and sandwich the strip shaped member 12. The nozzle members 60 are in contact with side surfaces of the pair of rolls 52 and 53, and are provided in a manner in which the pair of rolls 52 and 53 can rotate. Surfaces of the nozzle members 60 in contact with the pair of rolls 52 and 53 are formed into curved surfaces 60a having curvature equal to that of the pair of rolls 52 and 53. As shown in FIGS. 4 to 6B, a gate portion 62 of each of the nozzle members 60 is formed into a flat shape that is long in an axial direction of the rotation shafts 56 and 57 of the pair of rolls 52 and 53, and is connected to an injection molding machine (not shown). An injection portion 64 that communicates with the gate portion 62 of the nozzle member 60 and that faces the cavity 54, is formed into a flat shape that is longer than a length in the Z axial direction of the clip locking member 14 in an axial direction of the rotation shafts 56 and 57.

Next, a manufacturing method of the cover material fastening member 10 according to the present embodiment will be described. According to the manufacturing method of the cover material fastening member 10 in the present embodiment, the clip locking member 14 is integrally molded along a long side direction at the end edge portion 12*a* of the strip shaped member 12 fixed to the end edge 18*a* of the cover material 18, and a molten resin for forming the clip locking member 14 is injected, via the nozzle member 60, to the cavities 54 of the pair of rolls 52 and 53 for forming the clip locking member 14 (molding step). Then the rolls 52 and 53 are rotated in a manner of facing each other at the same speed in opposite directions in a state in which the strip shaped member 12 is interposed between the holding side surfaces 52*a* and 53*a* of the rolls 52 and 53. At this time, the cavities 54 of the rolls 52 and 53 are synchronously rotated at symmetrical positions and shapes.

An injection position of the molten resin is a position of $1/2\pi$ at an upstream side in the rotation direction of the rolls 52 and 53 from a facing position of surfaces of the rolls 52 and 53 for molding the clip locking member 14 at the strip shaped member 12. The injection position is appropriately set depending on a rotation speed of the pair of rolls 52 and 53, an amount of the molten resin, a cooling condition of the molten resin, and the like, and the injection position is appropriately set between a position of $1/2\pi$ and a position of $3/2\pi$ at an upstream side in the rotation direction of the pair of rolls 52 and 53 depending on adhesion of the molten resin to the strip shaped member 12 which will be described later.

After the molding step of the clip locking member 14, as shown in FIG. 1, the strip shaped member 12 is interposed between the holding side surfaces 52*a* and 53*a* of the rolls 52 and 53. When the pair of rolls 52 and 53 is rotated, the molten resin injected from the nozzle member 60 at the upstream side by $1/2\pi$ is rotated to a facing position of the rolls 52 and 53 in a state of being filled in the cavity 54. The strip shaped member 12 is interposed between the holding side surfaces 52*a* and 53*a* of the pair of rolls 52 and 53, the molten resin filled in the cavity 54 is press-bonded to two surfaces of the strip shaped member 12, and the molten resin in the cavity 54 is integrally joined to the strip shaped member 12 (press-bonding step). Accordingly, when the pair of rolls 52 and 53 is rotated, the central plate shaped portion 20, the end edge flange portions 22 and 26, and the intermediate flange portion 24 are integrally molded symmetrically on two side surfaces of the end edge portion 12*a* of the strip shaped member 12.

The resin for forming the clip locking member 14 is partially or entirely melted at a press-bonding surface side before the resin is press-bonded to the strip shaped member 12 in the press-bonding step, and is solidified after the resin is press-bonded to the strip shaped member 12. This is because the rolls 52 and 53 are made of a metal, the resin in contact with a metal surface at a side close to the rolls 52 and 53 is more easily cooled compared with the resin at a surface side in contact with air, and further cooling water is circulated inside the rolls 52 and 53 so that a shape of the molten resin can be adjusted inside and the resin is easily press-bonded in a state in which a surface side is in a molten state.

Since the nozzle member 60 includes the injection portion 64 through which the resin is injected, a sufficient amount of resin filled in the cavity 54 is applied to two surfaces of the strip shaped member 12 while the strip shaped member 12 is held between the holding side surfaces 52*a* and 53*a*. The resin filled in the cavity 54 is press-bonded to the strip shaped member 12, and the resin is reliably joined to the strip shaped member 12 by the rotation of the pair of rolls 52 and 53. Since the strip shaped member 12 is held between the holding side surfaces 52*a* and 53*a* of the pair of rolls 52 and 53 and the pair of rolls 52 and 53 has the outer side end edge 54*a* at a periphery portion of the cavity 54, the resin injected from the nozzle member 60 does not spill to the other surfaces of the rolls 52 and 53.

According to the manufacturing method of the cover material fastening member 10 and the manufacturing apparatus 50 of the cover material fastening member in the present embodiment, the clip locking member 14 can be molded efficiently and continuously, and the cover material fastening member 10 having a high bonding strength between the strip shaped member 12 and the clip locking member 14 can be manufactured. Further, the resin for the clip locking member 14 does not spill to a surface of the strip shaped member 12, and the cover material fastening member 10 can be neatly molded.

The clip locking member 14 having certain elasticity and high rigidity can be easily manufactured, and the clip locking member 14 capable of reliably locking the fastening clip 30 at a predetermined position can be continuously manufactured with high efficiency. In particular, a region is formed in which the clip locking member 14 is relatively thin by aligning positions of the locking recessed portions 29 in a manner of facing each other on two surfaces of the central plate shaped portion 20, and the clip locking member 14 is easily curved in the Y axial direction. Further, the groove 16*a* for hanging the cover material 18 can easily handle a curved portion. Since shapes of the locking recessed portions 29 are uniform, the pair of locking claws 32 of the fastening clip 30 can be formed into the same shape in accordance with a shape of the locking recessed portions 29, and shape matching is not necessary when the fastening clip 30 and the clip locking member 14 are engaged with each other.

The clip locking member 14 can be firmly provided with a high bonding strength at the strip shaped member 12 that is formed with dense fabric and has a high strength. The clip locking member 14 having unevenness such as the end edge flange portions 22 and 26, the intermediate flange portion 24, the rib portions 28, the locking recessed portions 29, and the like having a complicated shape can be accurately and reliably formed at the strip shaped member 12.

The manufacturing method of the cover material fastening member and manufacturing apparatus according to the present invention are not limited to those in the embodiment described above, and a shape of the clip locking member and a shape of the cavity of the pair of rolls for molding the clip locking member can be set as appropriate. A shape of the nozzle member and a shape of the injection portion can also be appropriately set in accordance with a shape of the clip locking member to be molded.

What is claimed is:

1. A manufacturing method of a cover material fastening member including a clip locking member that is attached to an end edge of a cover material and to which a fastening clip is locked, the fastening clip being used for attaching and fixing the cover material so as to cover a surface of a seat, wherein the clip locking member is integrally provided along a long side direction at an end edge portion of a strip shaped member fixed to the end edge of the cover material, the manufacturing method comprising:

a molding step of filling, with a resin for forming the clip locking member, a cavity formed on a surface of each of a pair of rolls in rotation; and a press-bonding step of passing the strip shaped member between the pair of rolls in accordance with rotation of the pair of rolls, passing the strip shaped member comprising holding the strip shaped member with holding side surfaces formed by side portions of circumferential surfaces of the pair of rolls, each of the holding side surfaces extending outwardly with respect to a center of a corresponding roll of the pair of rolls from an outer side end edge of the cavity, each of the holding side surfaces being formed to have a small step with respect to the outer side end edge, passing the strip shaped member further comprising holding the strip shaped member in the small step defined in each of the holding side surfaces, pressing the resin by the pair of rolls, and, after the molding step, continuously press-bonding the clip locking member to two surfaces of a first end edge portion of the strip shaped member, a second end edge portion at a side of the strip shaped member opposite to the first end edge portion being configured to be fixed to the cover material.

2. The manufacturing method according to claim 1, wherein the clip locking member comprises:

a central plate shaped portion formed at the end edge portion of the strip shaped member along the long side direction, a plurality of rib portions, each of the plurality of rib portions defining a surface intersecting the central plate shaped portion, adjacent rib portions of the plurality of rib portions formed at a predetermined interval along the long side direction, and a plurality of locking recessed portions, each of the plurality of locking recessed portions defined between adjacent rib portions of the plurality of rib portions, and wherein, in the press-bonding step, the central plate shaped portion is formed at two sides of the strip shaped member, and the rib portions and the locking recessed portions are formed on at least one surface of the strip shaped member, by rotating each roll of the pair of rolls.

3. The manufacturing method according to claim 2, wherein, in the press-bonding step, the central plate shaped portion, the rib portions, and the locking recessed portions are formed at symmetrical positions and/or into symmetrical shapes at the two sides of the strip shaped member, by rotating each roll of the pair of rolls.

4. The manufacturing method according to claim 3, wherein, in the press-bonding step, the resin:

is partially or entirely melted at a press-bonding surface side before the resin is press-bonded to the strip shaped member, and is solidified after the resin is press-bonded to the strip shaped member.

5. The manufacturing method according to claim 1, wherein entire side portions of the circumferential surfaces of the pair of rolls on which the cavities are formed are holding side surfaces that hold the strip shaped member.

* * * * *